(12) United States Patent
Miyagawa

(10) Patent No.: US 6,371,516 B1
(45) Date of Patent: Apr. 16, 2002

(54) PASSENGER-SIDE AIRBAG APPARATUS ACTIVATION CONTROL SYSTEM

(75) Inventor: Toshihito Miyagawa, Toyota (JP)

(73) Assignee: Toyota Jidosha Kabushiki Kaisha, Toyota (JP)

(*) Notice: Subject to any disclaimer, the term of this patent is extended or adjusted under 35 U.S.C. 154(b) by 0 days.

(21) Appl. No.: 09/568,976

(22) Filed: May 11, 2000

(30) Foreign Application Priority Data

May 21, 1999 (JP) ............................................ 11-142246

(51) Int. Cl.[7] ............................................. B60R 21/32
(52) U.S. Cl. ................ 280/735; 200/61.58 R; 200/43.04; 307/10.1
(58) Field of Search ................ 280/735; 701/45; 307/10.1; 297/256.16; 200/61.58 R, 43.04, 43.07, 43.08, 43.09

(56) References Cited

U.S. PATENT DOCUMENTS

| 5,324,074 A |   | 6/1994 | Christian et al. | |
| 5,428,340 A | * | 6/1995 | Kawabata et al. | 280/735 |
| 5,468,014 A |   | 11/1995 | Gimbel et al. | |
| 5,515,933 A | * | 5/1996 | Meyer et al. | 180/273 |
| 5,544,914 A |   | 8/1996 | Borninski et al. | |
| 5,636,864 A |   | 6/1997 | Hori | |
| 5,678,854 A | * | 10/1997 | Meister et al. | 180/273 |
| 5,690,356 A |   | 11/1997 | Lane, Jr. | |
| 5,851,025 A | * | 12/1998 | Gamboa | 180/268 |
| 5,866,954 A |   | 2/1999 | Daniel et al. | |
| 5,882,035 A |   | 3/1999 | Munro | |
| 5,992,879 A |   | 11/1999 | Bögge | |
| 5,992,880 A |   | 11/1999 | Cuddihy et al. | |
| 6,133,648 A | * | 10/2000 | Titus et al. | 180/287 |
| 6,164,693 A | * | 12/2000 | Mattes et al. | 180/272 |
| 6,273,460 B1 | * | 8/2001 | Cox | 280/735 |

FOREIGN PATENT DOCUMENTS

| DE | 196 44 219 C1 |   | 11/1997 |
| EP | 0 646 491 A1 |   | 4/1995 |
| EP | 0 719 680 A1 |   | 7/1996 |
| JP | 8-318814 |   | 3/1996 |
| JP | 9-156461 |   | 6/1997 |
| JP | 9-240336 |   | 9/1997 |
| JP | 409254739 A | * | 9/1997 |

* cited by examiner

Primary Examiner—Lanna Mai
Assistant Examiner—Ruth Ilan
(74) Attorney, Agent, or Firm—Oliff & Berridge, PLC (57) ABSTRACT

A child seat is an International Standard-compliant CRS. The CRS has right and left-side fastening attachments that are spaced from each other by a predetermined interval in a direction of a width of the CRS. CRS switch mechanisms are disposed at sites in a seat cushion at which anchor bars are disposed. At least one of the CRS mechanisms has a key cylinder. By turning the key cylinder through the use of an ignition key, a CRS detection switch can be switched between an ON state and an OFF state.

16 Claims, 10 Drawing Sheets

PASSENGER-SIDE AIRBAG APPARATUS ACTIVATION CONTROL SYSTEM

INCORPORATION BY REFERENCE

The disclosure of Japanese Patent Application No. HEI 11-142246 filed on May 21, 1999 including the specification, drawings and abstract is incorporated herein by reference in its entirety.

BACKGROUND OF THE INVENTION

1. Field of the Invention

The present invention relates to passenger-side airbag apparatus activation control system and, more particularly, to a system for controlling the activation of a passenger-side airbag apparatus capable of deploying an airbag forward of a passenger seat on which a child restraint seat is set.

2. Description of the Related Art

In known passenger-side airbag apparatus activation control systems, a switch mechanism is incorporated into an ISO-FIX (International Standard-compliant) anchor device provided in a passenger seat, and an ISO-FIX (International Standard-compliant) child restraint seat (CRS) is set on the passenger seat. An example of such systems is disclosed in U.S. Pat. No. 5,690,356.

Figure 10:
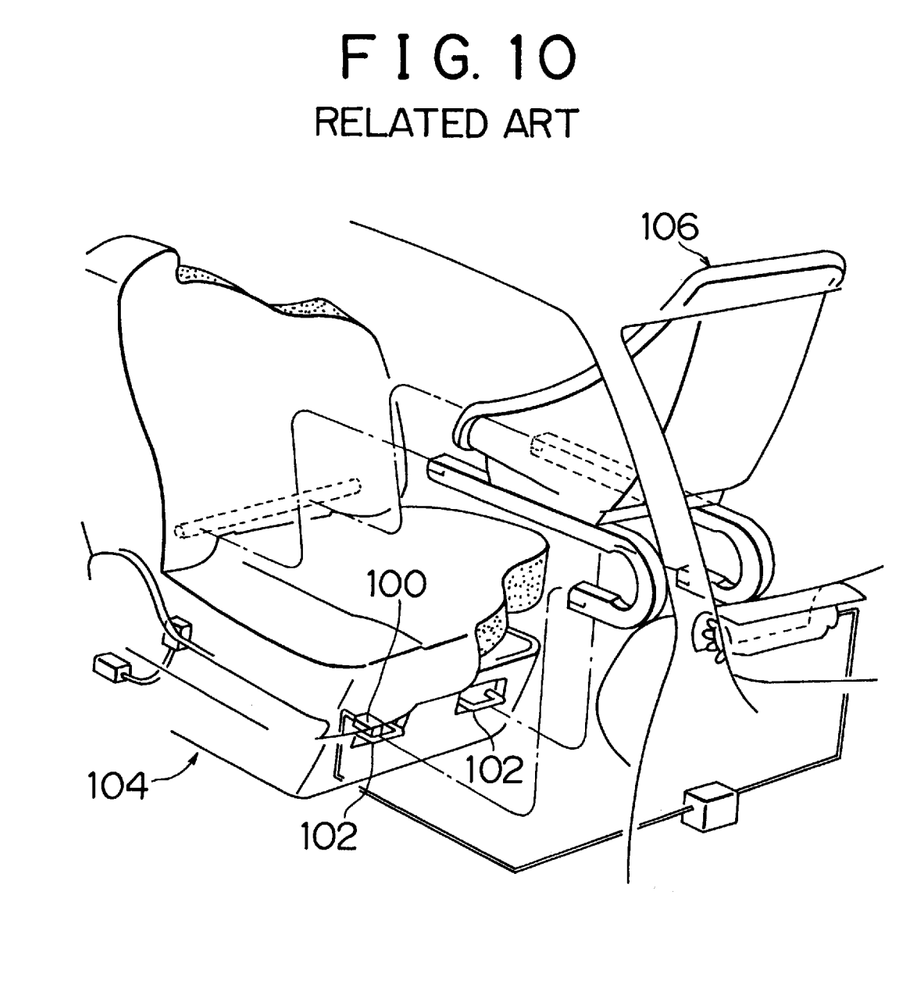
FIG. 10 is a perspective view taken from a point diagonally rearwardly outward of a vehicle, illustrating a related-art passenger-side airbag apparatus activation control system.

In the passenger-side airbag apparatus activation control system, as shown in FIG. 10, ISO-FIX anchors 102 each incorporating a switch mechanism 100 is disposed within a passenger seat 104. When an ISO-FIX CRS 106 is attached to the passenger seat 104, a passenger-side airbag apparatus activation circuit is automatically interrupted or turned off by the switch mechanisms 100. In this passenger-side airbag apparatus activation control system, when the ISO-FIX CRS 106 is detached from the ISO-FIX anchors 102, the passenger-side airbag apparatus activation circuit automatically returns to a conductive state.

In the passenger-side airbag apparatus activation control system, however, if an International Standard-uncompliant CRS, that is, a CRS not compliant with the International Standards, is attached to the passenger seat 104, the passenger-side airbag apparatus activation circuit is not interrupted. Therefore, it is necessary to provide a switch mechanism for interrupting the passenger-side airbag apparatus activation circuit in, for example, an instrument panel or the like, so that an occupant can operate the switch mechanism to turn off the passenger-side airbag apparatus activation circuit. Therefore, the passenger-side airbag apparatus activation control system becomes complicated.

SUMMARY OF THE INVENTION

Accordingly, it is an object of the invention to provide a passenger-side airbag apparatus activation control system capable of interrupting a passenger-side airbag apparatus activating circuit even when an International Standard-uncompliant CRS is attached, while eliminating the need to add a further switch mechanism.

In accordance with the invention, a system for controlling an activation of a passenger-side airbag apparatus includes a CRS switch mechanism that automatically interrupts and recovers a passenger-side airbag apparatus activating circuit upon attachment of an International Standard-compliant CRS to and detachment of the International Standard-compliant CRS from an International Standard-compliant anchor device disposed in a passenger seat, and a manual operation means for allowing the CRS switch mechanism to be manually switched between an on state and an off state.

Therefore, when the ISO-FIX CRS is attached to the ISO-FIX anchor device, the CRS switch mechanism automatically interrupts the passenger-side airbag apparatus activating circuit to prohibit the passenger-side airbag apparatus from being activated. When the ISO-FIX CRS is detached from the ISO-FIX anchor device, the CRS switch mechanism automatically recovers the passenger-side airbag apparatus activating circuit so that the passenger-side airbag apparatus becomes able to be activated. Furthermore, since the CRS switch mechanism can be switched between the on state and the off state by switching the manual operation means on and off, the system is able to interrupt the passenger-side airbag apparatus activating circuit even when an International Standard-uncompliant CRS is attached to the passenger seat, without a need to add a further switch mechanism.

The above-described system may further include a cancel mechanism that removes an interrupted state of the passenger-side airbag apparatus activating circuit established by the manual operation means, when the ISO-FIX CRS is attached to the ISO-FIX anchor device after the CRS switch mechanism has been caused to interrupt the passenger-side airbag apparatus activating circuit by the manual operation means.

Therefore, when the ISO-FIX CRS is attached to the ISO-FIX anchor device after the passenger-side airbag apparatus activating circuit has been interrupted by switching the CRS switch mechanism through the manual operation means, the interrupted state of the passenger-side airbag apparatus activating circuit established by the manual operation means is removed, that is, the manual operation means is switched to a side for recovering the passenger-side airbag apparatus activating circuit. Hence, the CRS switch mechanism can be automatically switched to the side for recovering the passenger-side airbag apparatus activating circuit by attaching the ISO-FIX CRS.

The above-described system may further include a warning means for outputting a warning when only one of a pair of manual operation means corresponding to a pair of ISO-FIX anchor devices is off.

Therefore, when only one of the pair of manual operation means corresponding to the pair of ISO-FIX anchor devices is off, a warning is produced by the warning means. Hence, if the manual operation of the manual operation means corresponding to the pair of ISO-FIX anchor devices is incomplete when an International Standard-uncompliant CRS is attached to the passenger seat or if the attachment of the ISO-FIX CRS is incomplete, it is possible to make an occupant realize such an incomplete state.

Furthermore, the above-described system may further include a cooperation means for causing a first one of a pair of manual operation means to cooperate with a second one of the pair of manual operation means when the second one of the pair of manual operation means is operated.

Therefore, when the second manual operation means is operated, the first manual operation means is switched together with the second manual operation means. Therefore, it becomes possible to prevent a user's error of leaving one of the manual operation means unoperated and to omit some of the component parts of the manual operation means.

BRIEF DESCRIPTION OF THE DRAWINGS

The foregoing and further objects, features and advantages of the present invention will become apparent from the following description of preferred embodiments with reference to the accompanying drawings, wherein like numerals are used to represent like elements and wherein.

DETAILED DESCRIPTION OF PREFERRED EMBODIMENTS

A first preferred embodiment of the passenger-side airbag apparatus activation control system of the invention will be described with reference to FIGS. 1 to 7.

In each drawing, an arrow FR indicates a forward direction with respect to a vehicle, and an arrow UP indicates an upward direction with respect to the vehicle, and an arrow IN indicates an inward direction along a width of the vehicle.

Figure 1:
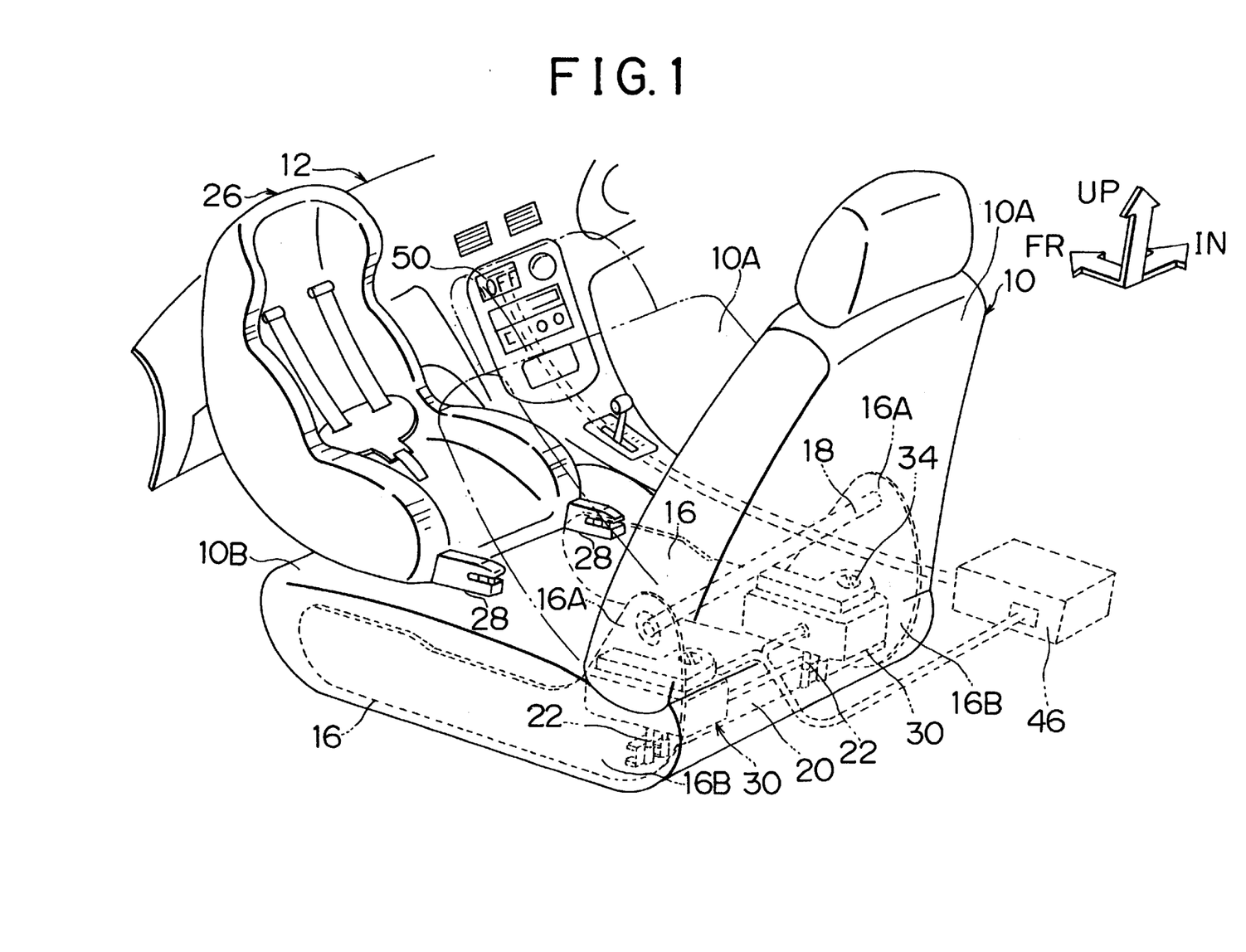
FIG. 1 is a perspective view taken from a point diagonally rearwardly outward of a vehicle, illustrating a system for controlling an activation of a system for controlling an activation of a passenger seat-side airbag apparatus according to a first embodiment of the invention.

As shown in FIG. 1, a passenger seat 10, that is, a vehicle-installed seat for an occupant to sit in, is connected to a floor surface of the vehicle via right and left-side seat tracks (not shown) extending parallel to each other in fore-aft directions with respect to the vehicle, so that the passenger seat 10 can be moved to a predetermined position in the fore-aft directions relative to the floor surface. An instrument panel 12 is disposed between a windshield and the floor surface forward of the passenger seat 10.

A rod 18 extends between upper rear end portions 16A of right and left-side seat cushion frames 16. A seatback 10A is pivotable about the rod 10 in the fore-aft directions. A bracket 20 extends between lower rear end portions 16B of the right and left-side seat cushion frames 16. Anchor bars 22, that is, International Standard-compliant (ISO-FIX) anchors, are fixed at their lower end portions to portions of the bracket 20 that are closer to opposite ends of the bracket 20 in the directions of its length.

A child restraint seat 26 set on a seat cushion 10B of the passenger seat 10 is an International Standard-compliant child restraint seat (ISO-FIX CRS). The CRS 26 has right and left-side fastening attachments 28 that are spaced from each other by a predetermined interval in the directions of the width of the CRS 26. The fastening attachments 28 extend in a forward-rearward direction with respect to the CRS 26, that is, forward of the CRS 26 (away from a seatback portion of the CRS 26) in FIG. 1. CRS switch mechanisms 30 are disposed at sites in the seat cushion 10B at which the anchor bars 22 are disposed.

Figure 2:
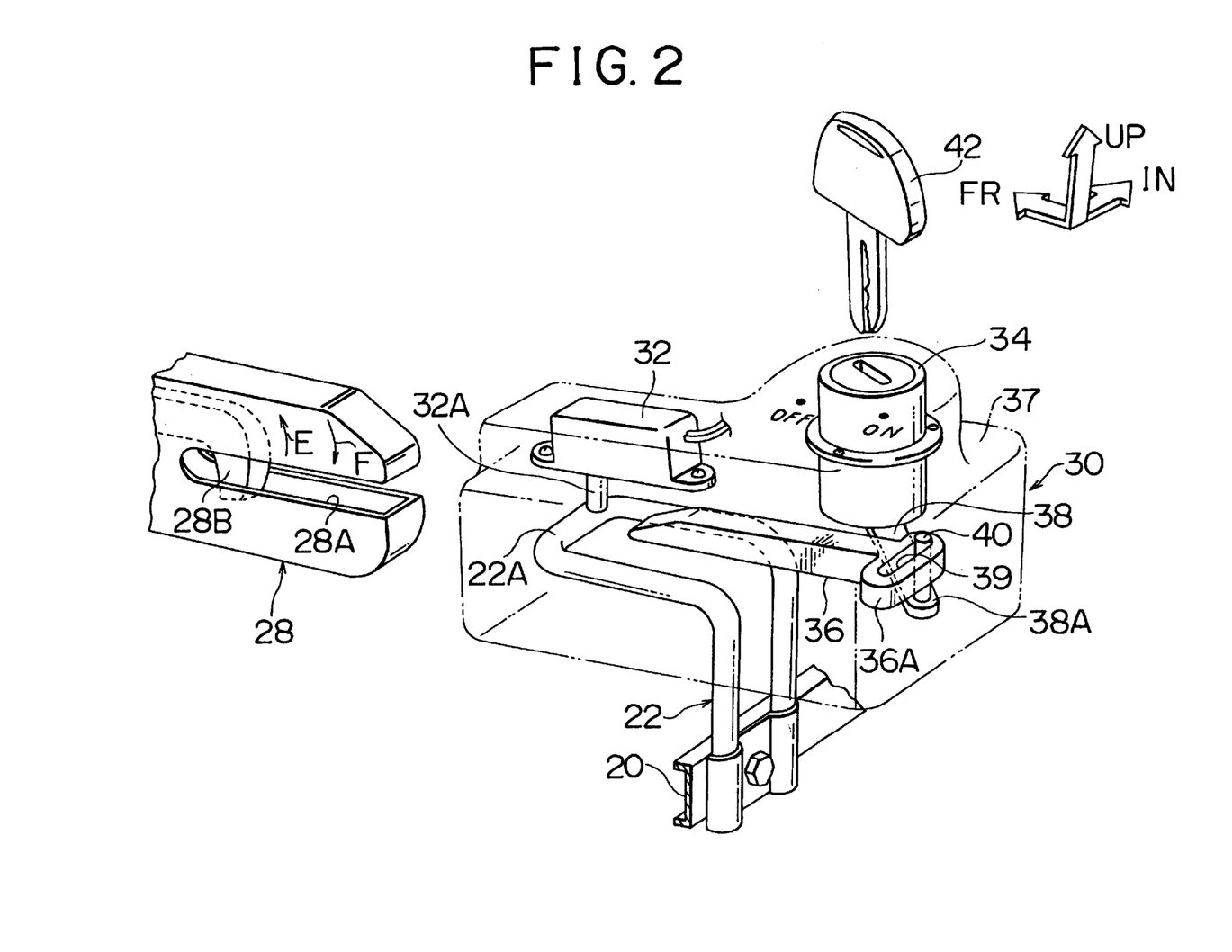
FIG. 2 is an enlarged perspective view taken from a point diagonally rearwardly outward of the vehicle, illustrating a CRS switch mechanism of the passenger-side airbag apparatus activation control system of the first embodiment of the invention.

As shown in FIG. 2, each anchor bar 22 is formed by a bar material that has a circular sectional shape. A distal end portion of each anchor bar 22 extends forward with respect to the vehicle, and is curved into a "U" shape in a plan view. A distal end portion of each fastening attachment 28 of the CRS 26 has a "U"-shape cutout 28A that receives therein the distal end portion 22A of the corresponding anchor bar 22. Each fastening attachment 28 has in its cutout 28A a lock bar 28B having an "L" shape in a side view. The lock bar 28B of each fastening attachment 28 is pivoted up and down (in directions indicated by an arrow E and an arrow F in FIG. 2) in accordance with operation of an operating lever (not shown), or automatically in association with attachment of the CRS 26 to the passenger seat 10.

Figure 4:
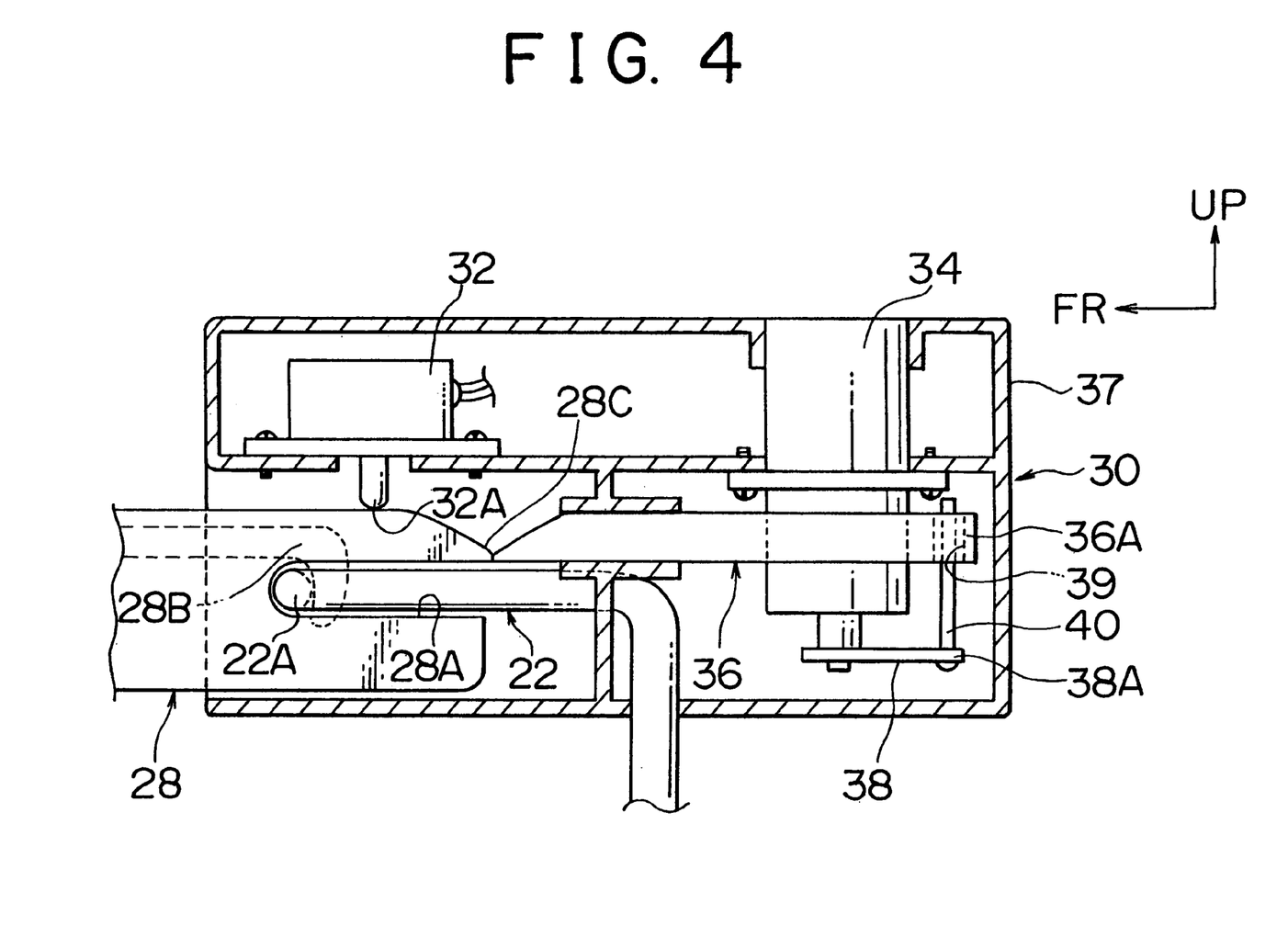
FIG. 4 is a side sectional view illustrating a state where an ISO-FIX CRS is attached in the passenger-side airbag apparatus activation control system of the first embodiment of the invention.

Therefore, when the lock bars 28B are turned downward (in the direction of the arrow F in FIG. 2) with the distal end portions 22A of the anchor bars 22 set in the cutouts 28A of the fastening attachments 28, a distal end portion of each lock bar 28B engages with a rearward portion of the distal end portion 22A of the corresponding anchor bar 22, thus assuming a locked state as shown in FIG. 4.

As shown in FIG. 2, each CRS switch mechanism 30 has a CRS detection switch 32, a key cylinder 34 provided as a manual operation device, a switch on/off lever 36, an arm 38, and a pin 40, and is disposed in a case 37. Since the right and left-side CRS-fastening constructions are substantially the same in this embodiment, one of them will be referred to as a representative in the following description of the embodiment. An end portion 36A of the switch on/off lever 36 has a "T" shape, and has an elongated hole 39. The pin 40 extending upward from a distal end portion 38A of the arm 38 connected to a rotating shaft of the key cylinder 34 is inserted in the elongated hole 39. Therefore, when the key cylinder 34 is turned by using an ignition key 42, the arm 38 is turned to move the switch on/off lever 36 forward or rearward with respect to the vehicle.

Figure 3:
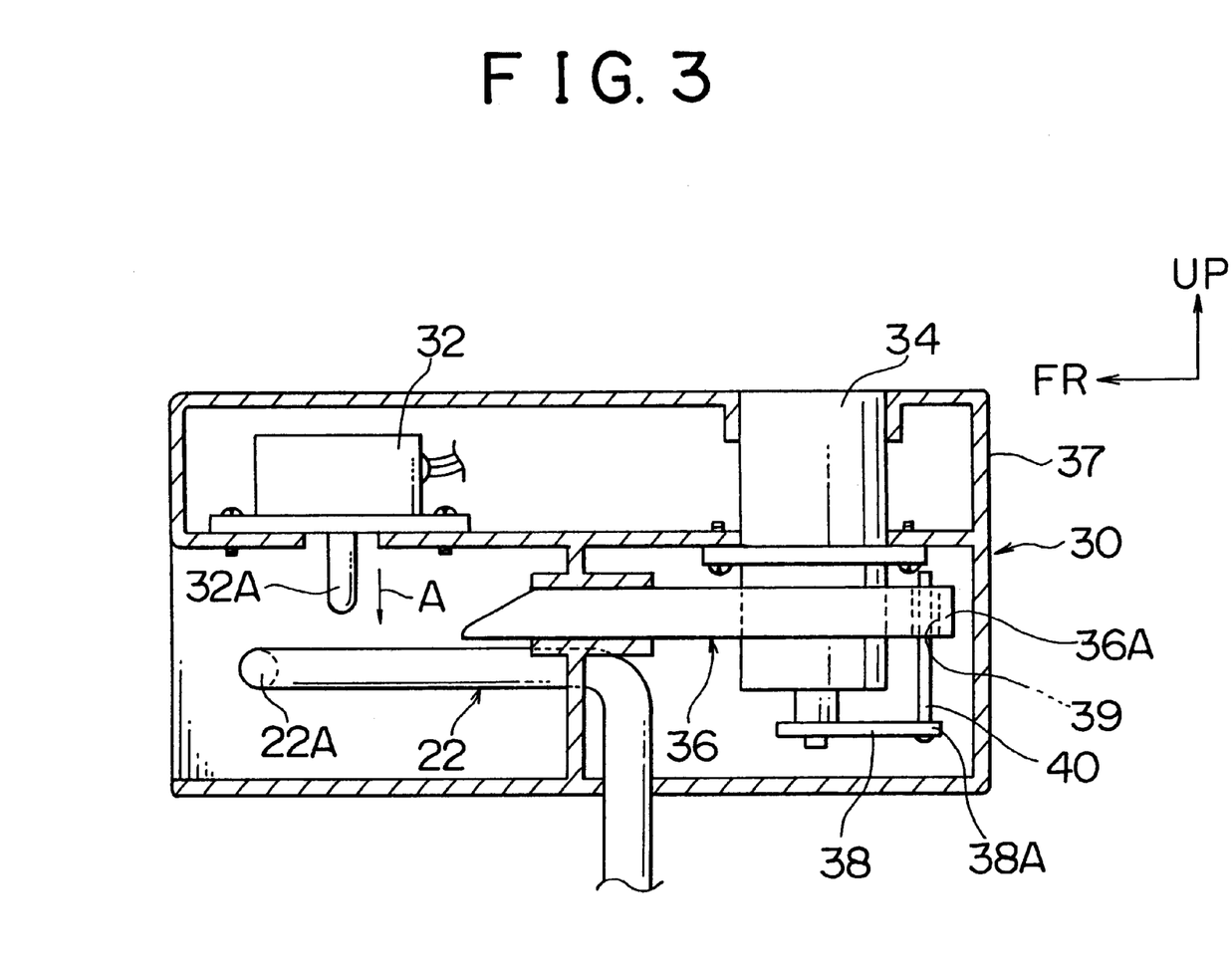
FIG. 3 is a side sectional view of the CRS switch mechanism of the passenger-side airbag apparatus activation control system of the first embodiment of the invention.

When the fastening attachment 28 of the CRS 26 is not engaged with the anchor bar 22 as shown in FIG. 3, the detection switch 32 is on, with an actuator 32A of the CRS detection switch 32 being lowered (in a direction indicated by an arrow A in FIG. 3).

When the fastening attachment 28 of the CRS 26 becomes engaged with the anchor bar 22 to assume the locked state as shown in FIG. 4, the actuator 32A of the CRS detection switch 32 slides along a sloped surface formed in a distal end portion of the fastening attachment 28, so that the actuator 32A is pushed in, that is, pushed upward. Thus, the CRS detection switch 32 is switched off.

Figure 5:
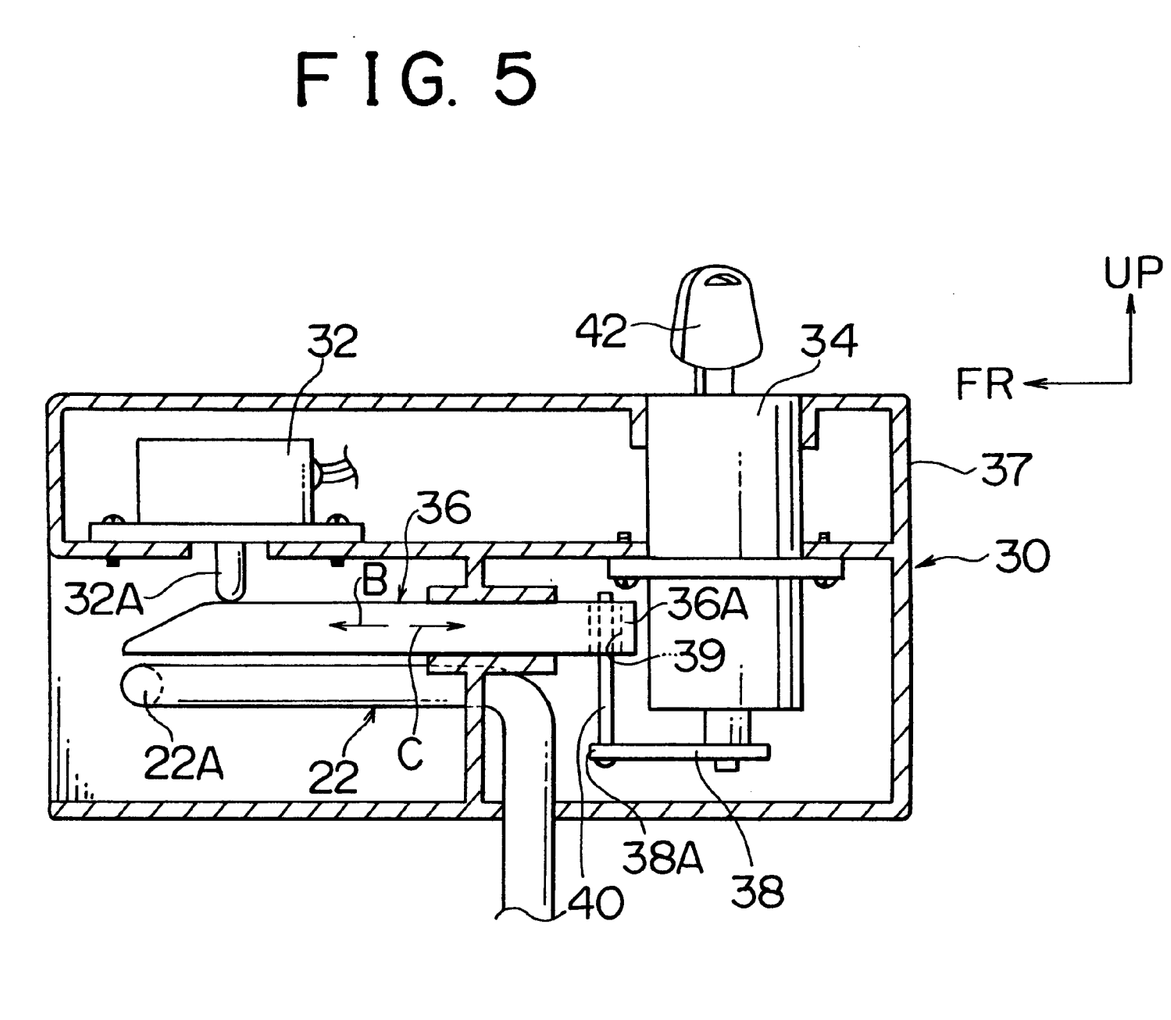
FIG. 5 is a side sectional view illustrating a state where the passenger-side airbag apparatus activation control system of the first embodiment of the invention is manually operated.

If an International Standard-uncompliant CRS, that is, a CRS not compliant with the International Standards, is fastened to the passenger seat, the two key cylinders 34 are turned toward an OFF position by using the ignition key 42 as shown in FIG. 5 while the seatback 10A is placed in a forwardly inclined position as indicated by a two-dot chain line in FIG. 1. Through the operation of turning each key cylinder 34, the corresponding arm 38 is turned to move the switch on/off lever 36 forward with respect to the vehicle (in a direction indicated by an arrow B in FIG. 5), so that the actuator 32A of the CRS detection switch 32 is pushed in and, therefore, switched off, by the switch on/off lever 36.

Figure 6:
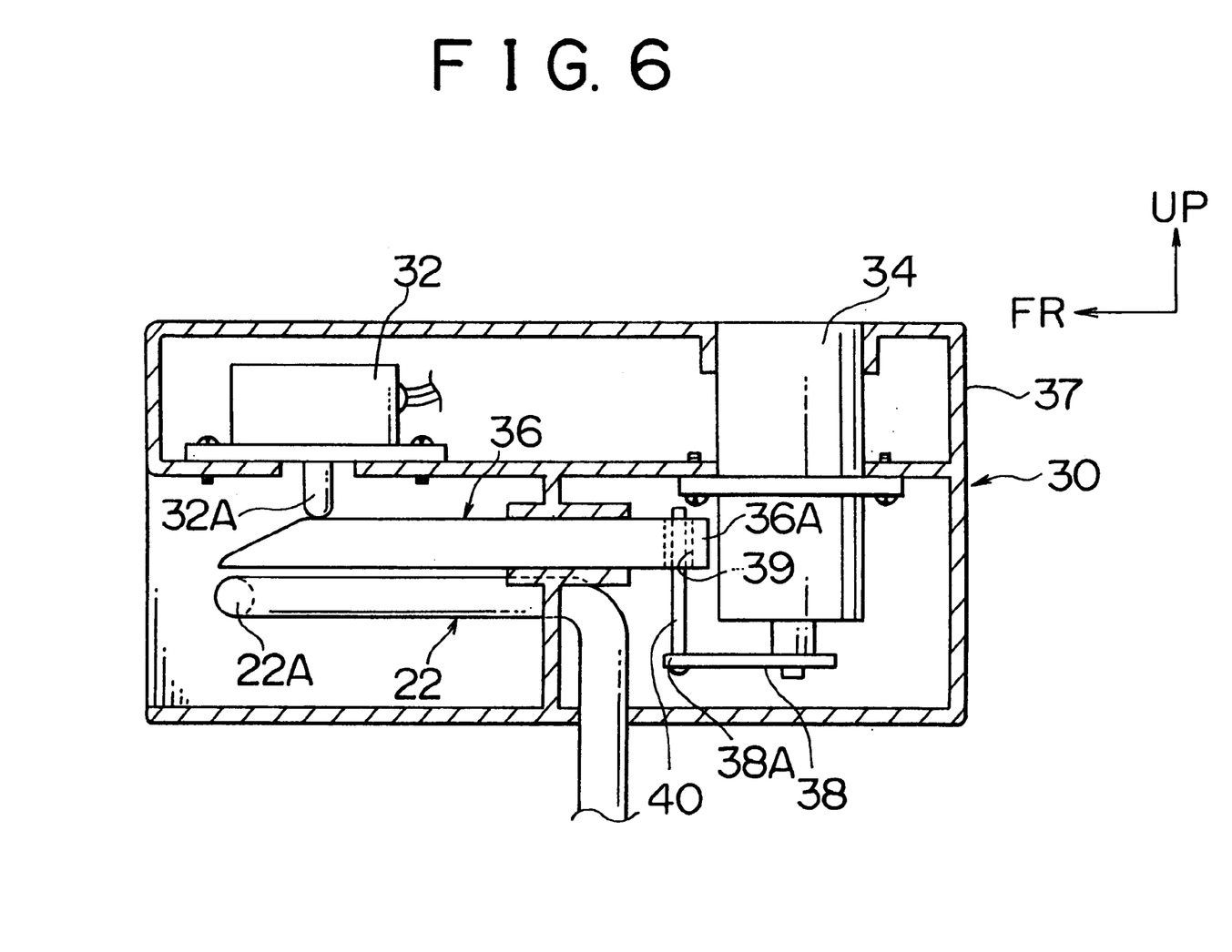
FIG. 6 is a side sectional view illustrating a state after the manual operation of the passenger-side airbag apparatus activation control system of the first embodiment of the invention.

After the key cylinder 34 has been turned to the OFF position by using the ignition key 42 (as shown in FIG. 5) and the ignition key 42 is pulled out of the key cylinder 34 as shown in FIG. 6, the state in which the actuator 32A of the CRS detection switch 32 is pushed in and the CRS detection switch 32 is off is maintained by the switch on/off lever 36.

To remove the state shown in FIG. 6, the key cylinder 34 is turned to an ON position by using the ignition key 42. When the fastening attachment 28 of the ISO-FIX CRS 26 is engaged with the anchor bar 22 as shown in FIG. 4, the fastening attachments 28 push back the corresponding switch on/off levers 36 rearward with respect to the vehicle (in the direction of the arrow C in FIG. 5). That is, the switch on/off lever 36, the arm 38 and the pin 40 of each CRS switch mechanism 30 form a cancel mechanism for removing the interruption of a passenger-side airbag apparatus activating circuit. Therefore, upon attachment of the CRS 26 to the anchor bars 22, the interruption of the passenger-side airbag apparatus activating circuit established by using the key cylinder 34 is removed.

Figure 7:
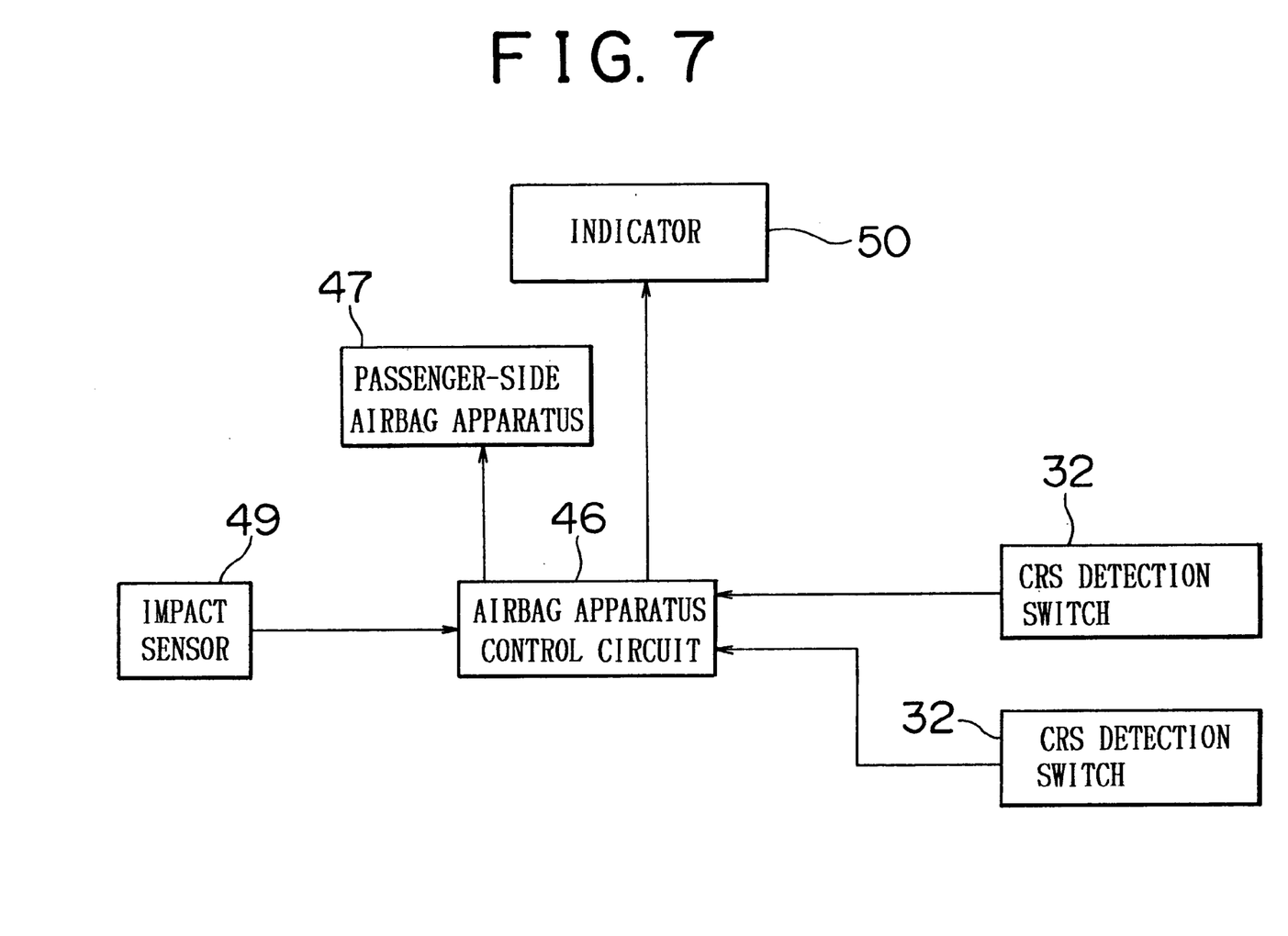
FIG. 7 is a block diagram of the passenger-side airbag apparatus activation control system of the first embodiment of the invention.

As shown in FIG. 7, the right and left-side CRS detection switches 32 are connected to an airbag apparatus control circuit 46 by electric wires. The airbag apparatus control circuit 46 is connected to a passenger-side airbag apparatus 47 disposed in the instrument panel 12 provided forward of the passenger seat 10 and to an impact sensor 49 that senses a deceleration that occurs on the vehicle at the time of an impact. The airbag apparatus control circuit 46 is also connected to an indicator 50 provided as a warning device in a substantially central portion of the instrument panel 12 in the direction of the width of the vehicle.

The indicator 50 illuminates an "OFF" indication by yellow light as shown in FIG. 1 when both the CRS detection switches 32 are off. When only one of the CRS detection switches 32 is off, the indicator 50 blinks the yellow light of the "OFF" indication to warn an occupant that the manual operation of the key cylinders 34 is incomplete and that the fastening of the ISO-FIX CRS 26 is incomplete.

As for the passenger-side airbag apparatus 47, circuitry may be designed so that if at least one of the CRS detection switches 32 is off, the passenger-side airbag apparatus 47 is prevented from being activated.

The operation of the embodiment will next be described.

In this embodiment, when the CRS 26 is set on the seat cushion 10B of the passenger seat 10, each lock bar 28B is turned upward (in the direction of the arrow E in FIG. 2) by operating the operating lever (not shown) or automatically in association with the setting of the CRS 26 onto the passenger seat 10. While this state is maintained, the CRS 26 is further moved rearward with respect to the vehicle along the seat cushion 10B. When each lock bar 28B turns downward (in the direction of the arrow F in FIG. 2), the distal end portion of each lock bar 28B engages with a rearward portion of the distal end portion 22A of the anchor bar 22, thus entering the locked state.

During this fastening movement of the CRS 26, the actuators 32A of the right and left-side CRS detection switches 32 are pushed upward while sliding along the inclined surfaces 28C formed in distal end portions of the fastening attachments 28, thus switching the CRS detection switches 32 off. Thus, the airbag apparatus control circuit 46 turns off the passenger-side airbag apparatus 47, that is, prevents the passenger-side airbag apparatus 47 from being activated even when an impact is detected by the impact sensor 49.

If the fastening of the CRS 26 is incomplete so that only one of the CRS detection switches 32 is off, the airbag apparatus control circuit 46 blinks the yellow light of the "OFF" indication of the indicator 50 to warn an occupant that the fastening of the CRS 26 is incomplete.

When the CRS 26 is detached from the anchor bars 22, the actuator 32A of each CRS detection switch 32 moves downward (in the direction of the arrow A in FIG. 3) as shown in FIG. 3. The CRS detection switches 32 thus return to the ON state, so that the passenger-side airbag apparatus 47 becomes able to be activated.

Furthermore, in this embodiment, if an International Standard-uncompliant CRS is attached to the passenger seat, each key cylinder 34 is turned to the OFF position by using the ignition key 42 as shown in FIG. 5 while the seatback 10A is placed in the forwardly inclined position as indicated by the two-dot chain line in FIG. 1. Through this the operation of turning each key cylinder 34, the corresponding arm 38 is turned to move the switch on/off lever 36 forward with respect to the vehicle (in the direction of the arrow B in FIG. 5), so that the actuator 32A of the CRS detection switch 32 is pushed in and, therefore, switched off, by the switch on/off lever 36. Thus, even when an International Standard-uncompliant CRS is fastened to the passenger seat 10, the passenger-side airbag apparatus 47 allows the airbag apparatus control circuit 46 to be interrupted, without employing a further switch mechanism.

Still further, in this embodiment, if only one of the pair of key cylinders 34 is turned off by using the ignition key 42, the airbag apparatus control circuit 46 blinks the yellow light of the "OFF" indication of the indicator 50 to warn an occupant that the manual operation of the key cylinders 34 is incomplete. Therefore, the embodiment is able to make the occupant realize that the manual operation of the pair of key cylinders 34 through the use of the key cylinder 34 is incomplete.

To remove the aforementioned state (as shown in FIG. 5), each key cylinder 34 is turned to the ON position by using the ignition key 42. Alternatively, when the fastening attachments 28 of the ISO-FIX CRS 26 are engaged with the anchor bars 22, the fastening attachments 28 push the switch on/off levers 36 rearward with respect to the vehicle (in the direction of the arrow C) as shown in FIG. 4. That is, by fastening the ISO-FIX CRS 26 to the anchor bars 22, the interruption of the passenger-side airbag apparatus activating circuit accomplished by the key cylinders 34 can be removed. That is, by attaching the ISO-FIX CRS 26, the CRS switch mechanisms are automatically switched to a side for recovering the passenger-side airbag apparatus activating circuit.

A second embodiment of the passenger-side airbag apparatus activation control system of the invention will be described with reference to FIG. 8.

Figure 8:
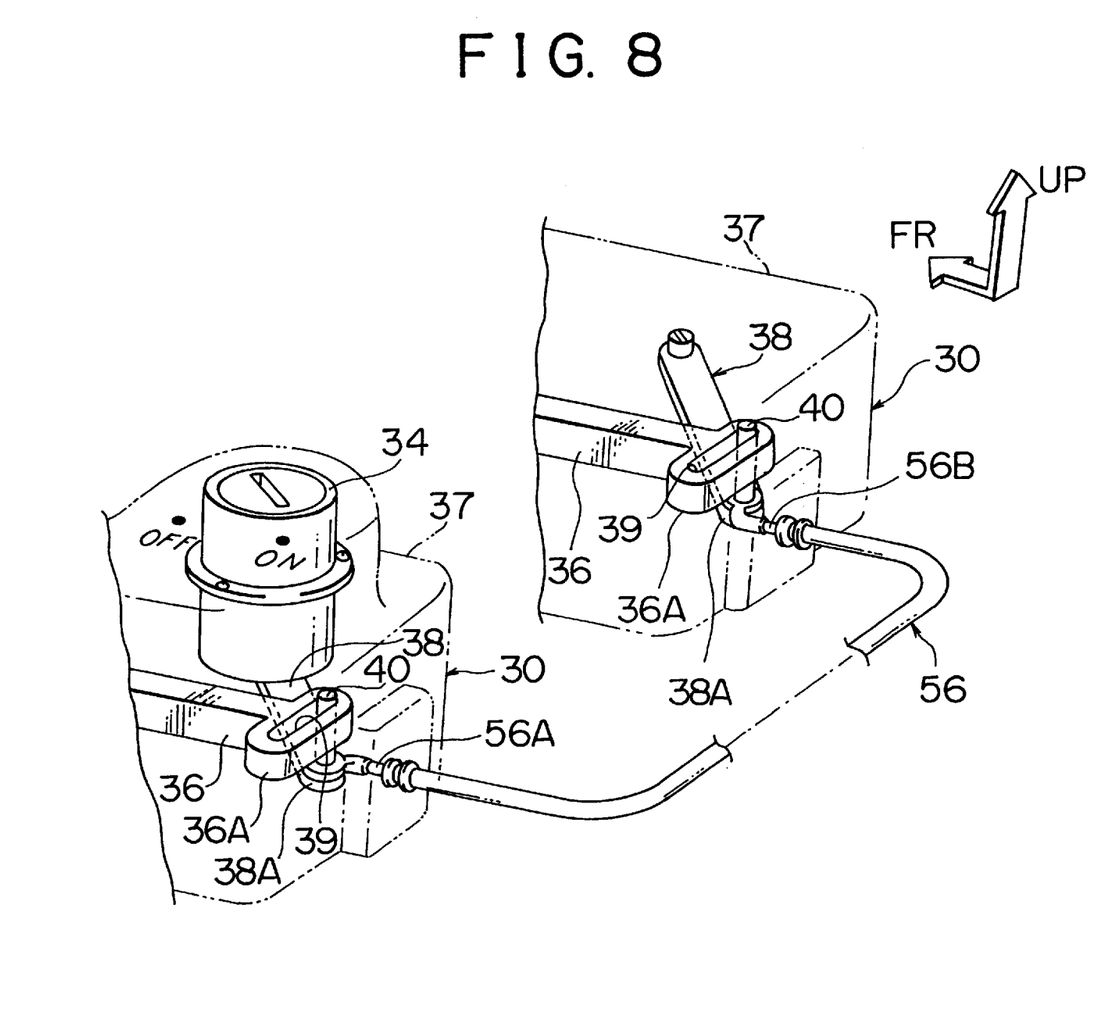
FIG. 8 is an enlarged perspective view taken from a point diagonally rearwardly outward of a vehicle, illustrating a CRS switch mechanism of a passenger-side airbag apparatus activation control system according to a second embodiment of the invention.

Members and portions of the second embodiment comparable to those of the first embodiment are represented in FIG. 8 by comparable reference characters, and will not be described again below.

In this embodiment, a first one of right and left-side CRS switch mechanisms 30, for example, a CRS switch mechanism 30 disposed outwardly in a passenger compartment of a vehicle, is provided with a key cylinder 34, whereas the second CRS switch mechanism 30, for example, the CRS switch mechanism 30 disposed closer to the center of the compartment, is not provided with a key cylinder 34, as shown in FIG. 8. In the first CRS switch mechanism 30 provided with the key cylinder 34, one end portion 56A of a wire 56 provided as a cooperation device is connected to a distal end portion 38A of an arm 38. The other end 56B of the wire 56 is connected to a distal end portion 38A of an arm 38 provided in the second CRS switch mechanism 30. Therefore, by turning the key cylinder 34 of the first CRS switch mechanism 30, the arm 38 of the second CRS switch mechanism 30 can be turned together.

The operation of this embodiment will be described below.

In addition to the operations of the first embodiment, the second embodiment allows the two CRS detection switches 32 to be switched simultaneously by turning the key cylinder 34 provided in one of the CRS switch mechanisms 30 since the arm 38 of the CRS switch mechanism 30 is drivingly connected to the arm 38 of the other CRS switch mechanism 30 by the wire 56. Therefore, this embodiment prevents a user's error of leaving one of the two CRS switch mechanisms 30 unoperated. Furthermore, since a key cylinder 34 is omitted from one of the two CRS switch mechanisms 30, the embodiment allows a weight reduction and a cost reduction.

Figure 9:
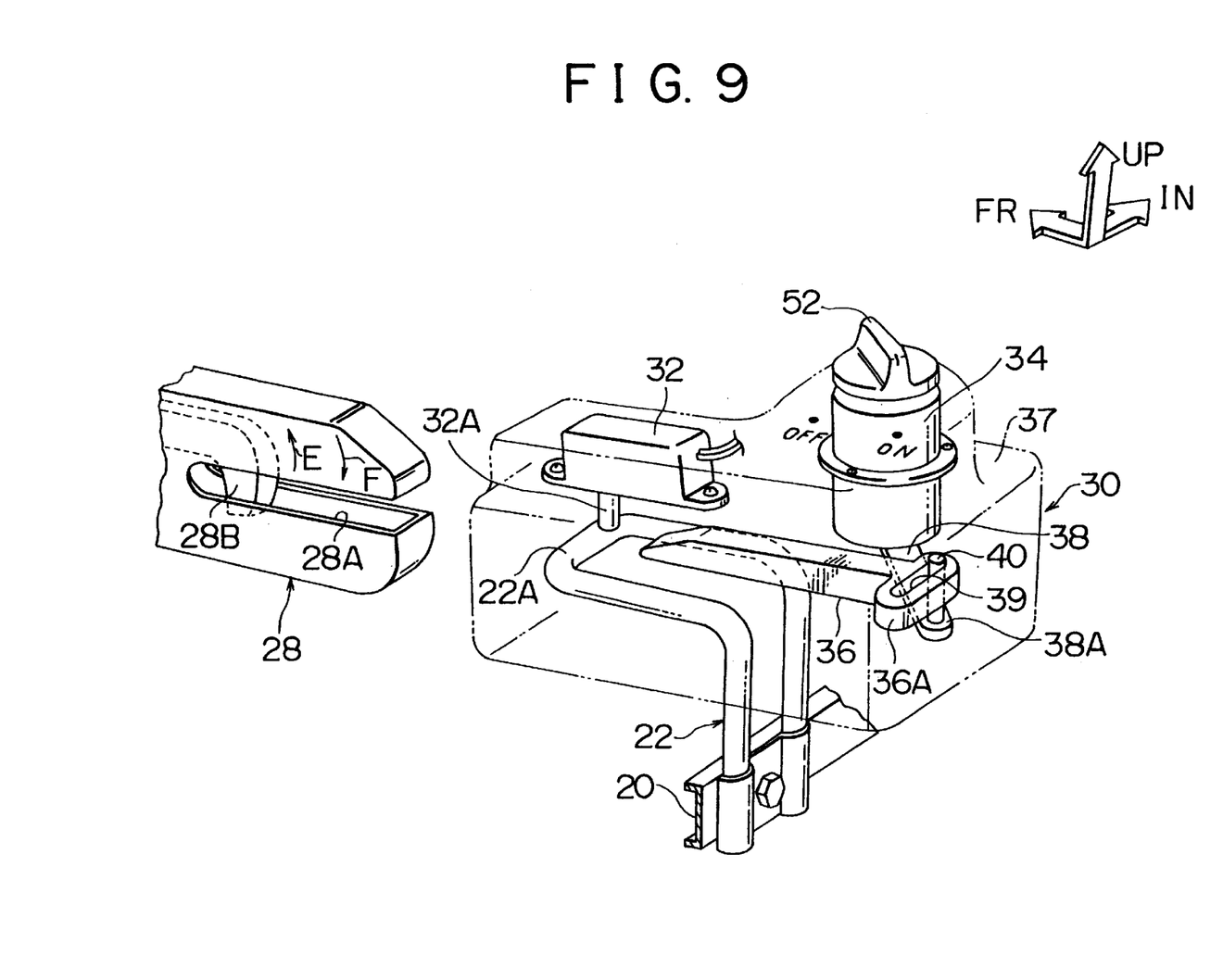
FIG. 9 is an enlarged perspective view taken from a point diagonally rearwardly outward of a vehicle, illustrating a CRS switch mechanism of a passenger-side airbag apparatus activation control system according to another embodiment of the invention.

While the present invention has been described with reference to what are presently considered to be preferred embodiments thereof, it should be apparent to those skilled in the art that the present invention is not limited to the disclosed embodiments or constructions. On the contrary, the present invention is intended to cover various modifications and equivalent arrangements. For example, although in the foregoing embodiments, the arms 38 are turned to move the switch on/off levers 36 forward with respect to the vehicle by turning at least one key cylinder 34 through the use of the ignition key 42, the at least one key cylinder 34 may be turned by using a key other than the ignition key 42. Furthermore, as shown in FIG. 9, each arm 38 may also be turned to move the corresponding switch on/off lever 36 forward with respect to the vehicle by directly turning a key cylinder 34 through the use of an operating knob 52 that partially forms a manual operation device connected to the key cylinder 34. Although in the foregoing embodiment, the yellow light of the "OFF" indication of the indicator 50 disposed in a substantially central portion of the instrument panel 12 in the direction of the width of the vehicle is flashed on and off as a means for warning an occupant, the warning means is not limited to flashing yellow light. For example, an indicator light other than yellow light may be simply turned on or flashed on and off. It is also possible to use other warning means, such as a buzzer or the like.

What is claimed is:

1. A system for controlling an activation of a passenger-side airbag apparatus, comprising:

an anchor device disposed in a passenger seat for attaching a child restraint seat to the passenger seat, said anchor device further comprising a child restraint seat switch mechanism that automatically interrupts an activation allowed state of a passenger-side airbag apparatus activating circuit upon attachment of the child restraint seat to the anchor device and automatically recovers said activation allowed state of the activating circuit upon detachment of the child restraint seat from the anchor device; and manual switch operation means disposed in said anchor device for allowing the child restraint seat switch mechanism to be manually switched between an on state and an off state, said on state corresponding to said activation allowed state and said off state corresponding to an activation prevented state that prevents said activation allowed state.

2. A system for controlling an activation of a passenger-side airbag apparatus according to claim 1, wherein the child restraint seat switch mechanism includes a mechanical switch that is operable by a fastening attachment provided on the child restraint seat, and switches the passenger-side airbag apparatus between the activation-allowed state and the activation-prevented state upon the mechanical switch being switched on and off.

3. A system for controlling an activation of a passenger-side airbag apparatus according to claim 2, wherein the manual switch operation means is connected to the mechanical switch, and allows the mechanical switch to be manually switched on and off.

4. A system for controlling an activation of a passenger-side airbag apparatus according to claim 2, wherein the mechanical switch is a push switch that is capable of being pushed by the fastening attachment.

5. A system for controlling an activation of a passenger-side airbag apparatus according to claim 4, wherein the manual operation means includes a manually operable key cylinder, and an arm cooperable with the key cylinder, and wherein the push switch is pushed by the arm.

6. A system for controlling an activation of a passenger-side airbag apparatus according to claim 5, wherein when the child restraint seat is attached to the anchor device, the fastening attachment pushes and moves the arm to a position where the arm is out of a contact with the push switch.

7. A system for controlling an activation of a passenger-side airbag apparatus according to claim 5, wherein the key cylinder is operated by an ignition key.

8. A system for controlling an activation of a passenger-side airbag apparatus according to claim 7, wherein the key cylinder has an operating knob.

9. A system for controlling an activation of a passenger-side airbag apparatus according to claim 1, further comprising a cancel mechanism that removes the activation prevented state of the passenger-side airbag apparatus activating circuit established by the manual switch operation means, when the child restraint seat is attached to the anchor device after the child restraint seat switch mechanism has been caused to interrupt the passenger-side airbag apparatus activating circuit by the manual switch operation means.

10. A system for controlling an activation of a passenger-side airbag apparatus according to claim 1, further comprising a second anchor device disposed in the passenger seat; said second anchor device including a second manual switch operation means for allowing a second child restraint switch mechanism to be manually switched between an on state and an off state and warning means for outputting a warning when only one of the pair of manual switch operation means is switched off.

11. A system for controlling an activation of a passenger-side airbag apparatus according to claim 10, wherein when the pair of manual switch operation means are both off, the warning means indicates that the passenger-side airbag apparatus is in an activation-prevented state.

12. A system for controlling an activation of a passenger-side airbag apparatus according to claim 11, wherein the warning means includes an indicator that lights when the pair of manual switch operation means are both off, and that blinks when only one of the pair of manual operation means is off.

13. A system for controlling an activation of a passenger-side airbag apparatus according to claim 1, further comprising a second anchor device disposed in the passenger seat; said second anchor device including a second manual switch operation means for allowing a second child restraint seat switch mechanism to be manually switched between an on state and an off state, wherein the passenger-side airbag apparatus is switched to the activation-prevented state when only one of the pair of manual switch operation means is switched off.

14. A system for controlling an activation of a passenger-side airbag apparatus according to claim 1, further comprising a second manual switch operation means for allowing the child restraint seat switch mechanism to be manually switched between an on state and an off state; and cooperation means for causing the first manual switch operation means to cooperate with the second manual switch operation means when the second manual switch operation means is operated.

15. A system for controlling an activation of a passenger-side airbag apparatus according to claim 14, wherein the cooperation means includes a wire that mechanically interconnects the pair of manual switch operation means.

16. A system for controlling an activation of a passenger-side airbag apparatus, comprising:

an anchor device disposed in a passenger seat for attaching a child restraint seat to the passenger seat, said anchor device further comprising a child restraint seat switch mechanism that automatically interrupts an activation allowed state of a passenger-side airbag apparatus activating circuit upon attachment of the child restraint seat to the anchor device and automatically recovers said activation allowed state of the activating circuit upon detachment of the child restraint seat from the anchor device; and a manual switch operation mechanism disposed in said anchor device that allows the child restraint seat switch mechanism to be manually switched between an on state and an off state, said on state corresponding to said activation allowed state and said off state corresponding to an activation prevented state that prevents said activation allowed state.

* * * * *